(12) United States Patent  (10) Patent No.: US 8,628,299 B2
Ammann et al.  (45) Date of Patent: Jan. 14, 2014

(54) SYSTEM FOR COOLING TURBINE BLADES (75) Inventors: Luke John Ammann, Simpsonville, SC (US); Randall Richard Good, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 1030 days.

(21) Appl. No.: 12/691,691

(22) Filed: Jan. 21, 2010

(65) Prior Publication Data

US 2011/0176929 A1    Jul. 21, 2011

(51) Int. Cl.
F01D 5/18    (2006.01)

(52) U.S. Cl.
USPC ........................................ 416/97 R; 416/92

(58) Field of Classification Search
USPC .............. 415/115, 173.1; 416/92, 96 R, 97 R
See application file for complete search history.

(56) References Cited

U.S. PATENT DOCUMENTS

| | | | | |
|---|---|---|---|---|
| 4,390,320 A * | 6/1983 | Eiswerth | ...................... | 416/97 R |
| 4,726,104 A * | 2/1988 | Foster et al. | .................. | 29/889.1 |
| 5,183,385 A * | 2/1993 | Lee et al. | ...................... | 416/97 R |
| 5,733,102 A * | 3/1998 | Lee et al. | ...................... | 416/97 R |
| 5,927,946 A * | 7/1999 | Lee | .............................. | 416/97 R |
| 7,641,444 B1 * | 1/2010 | Liang | ................................. | 416/1 |
| 7,922,451 B1 * | 4/2011 | Liang | .......................... | 416/97 R |
| 7,997,865 B1 * | 8/2011 | Liang | ............................... | 416/92 |
| 8,061,987 B1 * | 11/2011 | Liang | ............................... | 416/92 |
| 8,096,768 B1 * | 1/2012 | Liang | .......................... | 416/97 R |
| 8,246,307 B2 * | 8/2012 | Cheong et al. | .............. | 416/97 R |
| 2010/0111704 A1 * | 5/2010 | Hada | ........................... | 416/97 R |

OTHER PUBLICATIONS

U.S. Appl. No. 12/425,434, filed Apr. 17, 2009, Amaral et al.

* cited by examiner

*Primary Examiner* — Edward Look
*Assistant Examiner* — Liam McDowell
(74) *Attorney, Agent, or Firm* — Fletcher Yoder, P.C.

(57) ABSTRACT

A system, in one embodiment, includes a turbine blade having a radial blade tip. The system further includes a trailing edge trench that is formed in the radial blade tip and which extends towards a trailing edge of the turbine blade. The trailing edge trench further includes a first set of cooling passages, each of which includes a first slot formed along a first sidewall of the trailing edge trench, whereby the slot is coupled to a first respective hole extending through a floor of the trailing edge trench.

20 Claims, 5 Drawing Sheets

SYSTEM FOR COOLING TURBINE BLADES

BACKGROUND OF THE INVENTION

The subject matter disclosed herein relates to gas turbine engines and, more specifically, to turbine blade tips.

Gas turbine systems typically include at least one gas turbine engine having a compressor, a combustor, and a turbine. The combustor is configured to combust a mixture of fuel and compressed air to generate hot combustion gases, which, in turn, drive one or more blades of the turbine into rotation. For instance, the turbine blades may extend radially outwards from a supporting rotor disk, and the rotation of the turbine blades may generate power for a load and/or the compressor. Unfortunately, during operation, the turbine blades are continuously exposed to the hot combustion gases, thus resulting in the turbine blades and, particularly the turbine blade tips, being difficult to cool. Without proper cooling, the tip of the turbine blades may be subject to oxidation and cracking, thereby reducing the operational life and performance of the turbine blades.

BRIEF DESCRIPTION OF THE INVENTION

In one embodiment, a system includes a turbine blade having a radial blade tip. The system further includes a trailing edge trench that is formed in the radial blade tip and which extends towards a trailing edge of the turbine blade. The trailing edge trench further includes a first set of cooling passages, each of which includes a first slot formed along a first sidewall of the trailing edge trench, whereby the slot is coupled to a first respective hole extending through a floor of the trailing edge trench.

In another embodiment, a system includes a turbine. The turbine includes a turbine blade having a leading edge and a trailing edge, wherein the turbine blade includes a radial blade tip. The system further includes a trailing edge trench extending along the radial blade tip towards the trailing edge. The trailing edge trench includes a pressure side trench wall, a suction side trench wall, a trench floor, and a plurality of cooling passages angled in a downstream direction towards the trailing edge of the turbine blade.

In a further embodiment, a system includes a turbine. The turbine includes a turbine blade having a leading edge and a trailing edge, wherein the turbine blade includes a radial blade tip. The system further includes a trailing edge trench extending chordally along a trailing edge portion of the radial blade tip towards the trailing edge, wherein the length of the trailing edge portion is between approximately 5 to 40 percent of the length of the turbine blade. Additionally, the system includes a plurality of angled cooling passages arranged within the trailing edge portion and within the trailing edge trench.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed further below, certain embodiments provide a turbine system that includes turbine blades configured for enhanced cooling of the blade tips. For instance, in one embodiment, the tips of the turbine blades may include trailing edge trenches having passages formed therein to provide for enhanced cooling to protect the tips of the turbine blades and, particularly, the portion of the tips closer to the trailing edge of the turbine blades from the hot combustion gases flowing through the turbine. As used herein, the term "trailing edge" or the like shall be understood to refer to the edge of the turbine blade on the downstream side with respect to the flow of combustion gases through the turbine. The trailing edge of the blade tip is generally more difficult to cool due to the aerodynamics of turbine blades. For instance, in certain turbine blades which provide film holes on the pressure side and suction side, most of the cooling air discharged via the film holes is swept over the suction side tip wall before reaching the trailing edge of the blade.

Accordingly, the cooling passages formed in the trailing edge trench, in accordance with the present technique, may be angled to direct a coolant downstream through the trailing edge trench and towards the trailing edge of the turbine blade. In certain embodiments, the cooling passages may include a hole that extends through the floor of the trailing edge trench and continues as a slot or groove along a sidewall of the trailing edge trench. In one embodiment, the cooling passages may be formed in a staggered arrangement along opposite sidewalls of the trailing edge trench. The cooling air supplied to the trailing edge insulates the trailing edge of the blade tip from hot combustion gases. This may reduce oxidation rates and cracking while increasing the operational life of the turbine blade.

Figure 1:
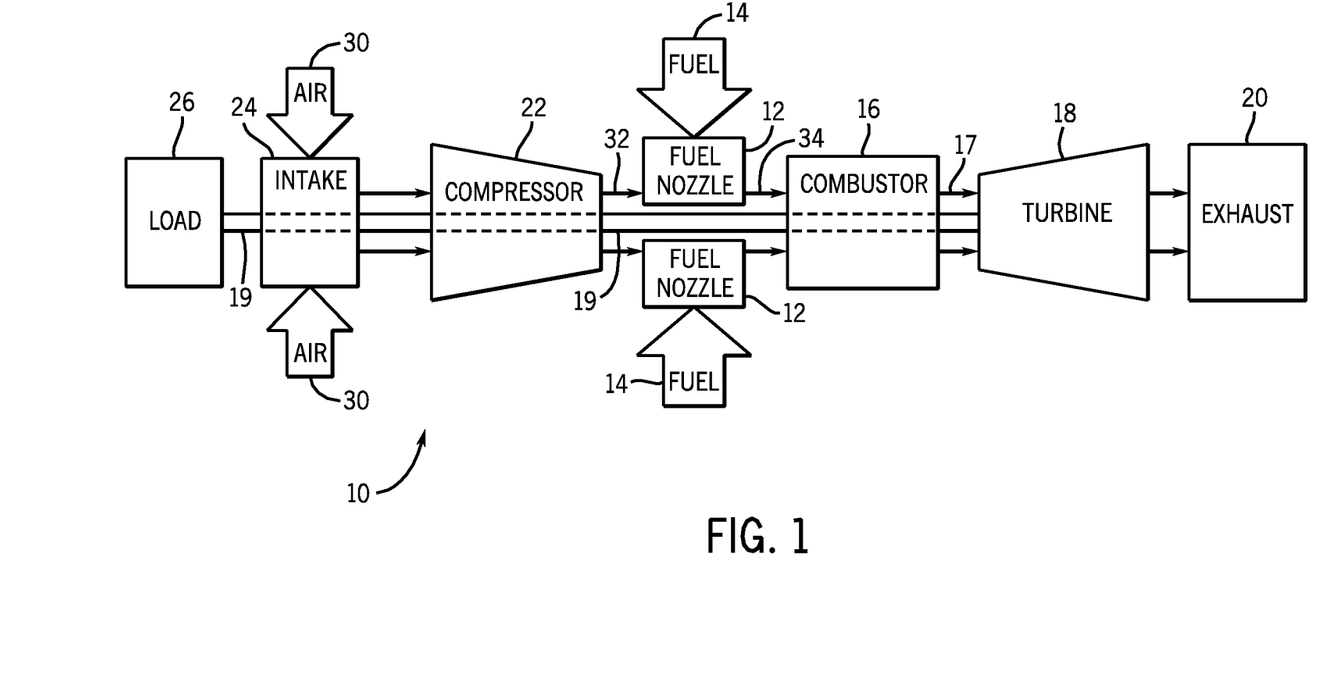
FIG. 1 is a block diagram depicting an embodiment of a turbine system that includes turbine blades having tips with a trailing edge trench configured to provide enhanced cooling.

Turning now to the drawings, FIG. 1 illustrates a block diagram of an embodiment of a gas turbine system 10. The diagram includes fuel nozzles 12, a fuel supply 14, and a combustor 16. As depicted, the fuel supply 14 routes a liquid fuel and/or gas fuel, such as natural gas or syngas, to the turbine system 10 through the fuel nozzle 12 and into the combustor 16. The combustor 16 ignites and combusts the fuel-air mixture, and then passes hot pressurized combustion gases 17 (e.g., exhaust) into a turbine 18. Turbine blades may be coupled to a shaft 19, which is also coupled to several other components throughout the turbine system 10, as illustrated. As the combustion gases 17 pass through the turbine blades in the turbine 18, the turbine 18 is driven into rotation, which also causes the shaft 19 to rotate. Eventually, the combustion gas 17 may exit the turbine system 10 via an exhaust outlet 20.

In an embodiment of the turbine system 10, compressor blades may be included as components of the compressor 22. The blades within the compressor 22 may be coupled to the shaft 19, and will rotate as the shaft 19 is driven to rotate by the turbine 18, as discussed above. The compressor 22 may intake air to the turbine system 10 via an air intake 24. Further, the shaft 19 may be coupled to a load 26, which may be powered via rotation of the shaft 19. By way of example, the load 26 may be any suitable device that may generate power via the rotational output of the turbine system 10, such as a power generation plant or an external mechanical load. For instance, the load 26 may include an electrical generator, a propeller of an airplane, and so forth. The air intake 24 draws air 30 into the turbine system 10 via a suitable mechanism, such as a cold air intake, for subsequent mixture of the air 30 with the fuel supply 14 via the fuel nozzle 12. The air 30 taken in by the turbine system 10 may be fed and compressed into pressurized air by rotating blades within the compressor 22. The pressurized air, shown by reference number 32, may then be fed into the fuel nozzle 12. The fuel nozzle 12 may then mix the pressurized air and fuel, shown by reference number 34, to produce a suitable mixture ratio for combustion, e.g., a combustion that causes the fuel to more completely burn, so as not to waste fuel or cause excess emissions.

Figure 2:
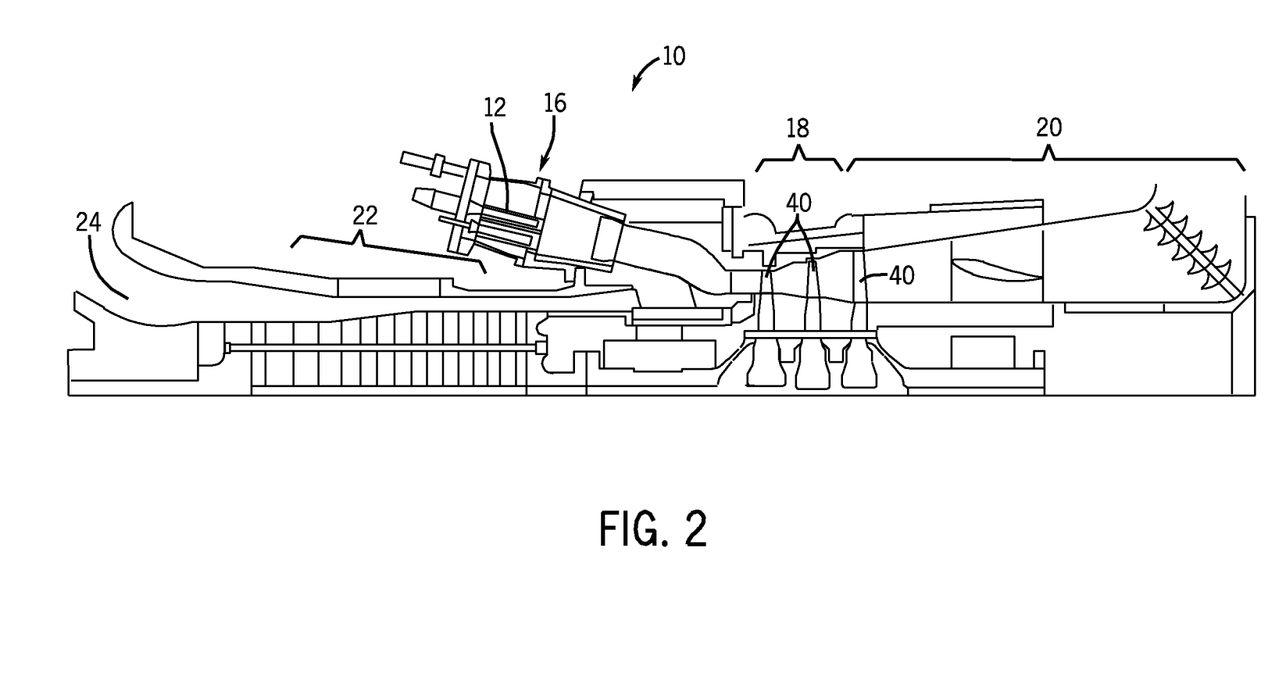
FIG. 2 is a cutaway side view of an embodiment of the turbine system, as shown in FIG. 1.

FIG. 2 shows a cutaway side view of an embodiment of the turbine system 10. As depicted, the embodiment includes the compressor 22, which is coupled to an annular array of combustors 16 (e.g., 6, 8, 10, 12 or more combustors 16). Each combustor 16 includes at least one fuel nozzle 12 (e.g., 1, 2, 3, 4, 5, 6, 7, 8, 9, 10, or more), which feeds an air-fuel mixture 34 to a combustion chamber located within each combustor 16. The combustion of the air-fuel mixture 34 within the combustors 16 causes turbine blades 40 within the turbine 18 to rotate about a longitudinal rotational axis 38 as combustion gases 17 pass through the turbine 18 and towards the exhaust outlet 20. As discussed in further detail below, in certain embodiments of the turbine 18, the turbine blades 40 may include trailing edge trenches having passages formed therein to provide for enhanced cooling to protect the turbine blades 40 and, particularly, the tips (e.g., radially furthest from the axis 38) of turbine blades 40 from the hot combustion gases 17. For instance, cooling air, which may be bled from the compressor or from another source, may be channeled through a hollow cavity within each turbine blade 40 and out through one or more angled cooling passages into the trailing edge trench. As will be appreciated, the cooling air within the trailing edge trench forms an insulating barrier, which helps to protect the tips of the turbine blades 40 from the hot combustion gases flowing through the turbine 18. These features will be illustrated and described in more detail with respect to FIGS. 3-8 below.

Figure 3:
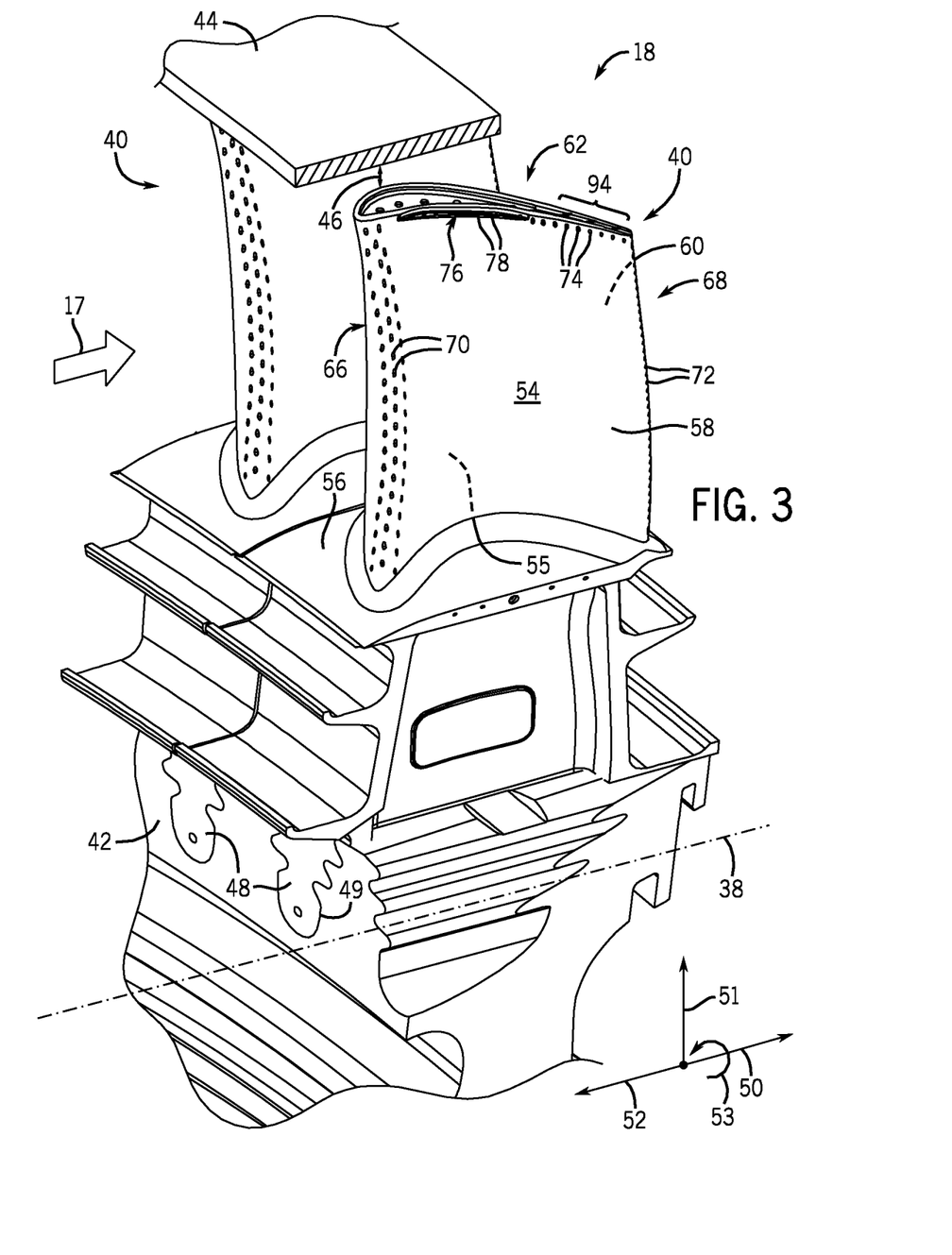
FIG. 3 is an isometric view of an embodiment of a turbine section of the turbine system, as shown in FIG. 2, that includes a turbine blade mounted on a rotor disk.

FIG. 3 depicts a portion of the turbine 18 of the turbine system 10 shown in FIG. 2. The turbine 18, which may be symmetrical about the rotational axis 38, includes a plurality of circumferentially-spaced radial turbine blades 40 (sometimes also referred to as turbine rotor blades or buckets) that extend radially outwardly from a rotor disk 42 along a radial axis, as indicated by radial directional arrow 51. The turbine 18 also includes an annular turbine shroud 44 that surrounds the turbine blades 40. Generally, the turbine shroud 44 is configured to provide a relatively small clearance or gap 46 between the turbine blades 40, thus limiting the leakage of combustion gases 17 therethrough during operation. As shown each turbine blade 40 may include a dovetail 48, an airfoil 54, and a platform 56. The dovetail 48 may have any suitable form, such as an axial dovetail configured for being mounted in a corresponding dovetail slot 49 along the perimeter of the rotor disk 42. The airfoil 54 may be integrally joined to the dovetail 48 and extends radially therefrom. The platform 56 may be disposed at the junction of the airfoil 54 and the dovetail 48 for defining a portion of the flow path for the combustion gases 17. As will be appreciated, the turbine blades 40 may be formed by any suitable technique, including casting, machining, molding, and so forth.

In the illustrated embodiment, the airfoil 54 includes a generally concave pressure sidewall 58 and a circumferentially or laterally opposite suction sidewall 60 (shown via the phantom lead line), each of which extends axially between a leading edge 66 and a trailing edge 68. As mentioned above, the leading edge 66 refers to the edge on the upstream side (e.g., direction 52) of the turbine blade 40, and the trailing edge 68 refers to the edge on the downstream side (e.g., direction 50) of the turbine blade 40 with respect to the direction in which the combustion gases 17 flow through the turbine 18. Additionally, the pressure sidewall 58 and the suction sidewall 60 are spaced apart in the circumferential direction 53 to form an at least partially hollow interior cavity 55 (shown via the phantom lead line) that defines at least one internal flow chamber or channel for channeling cooling air through the airfoil 54 for cooling the turbine blade 40. In certain embodiments, the interior of the cavity 55 may include a number of structures to enhance cooling, such as serpentine flow channels, turbulators, or the like. As discussed above, in certain embodiments, the cooling air may be bled from the compressor 22 or supplied from another coolant source.

The cooling air received by the cavity 55 may be discharged through film cooling holes 70 and trailing edge discharge holes 72. Cooling air may also be discharged through additional cooling holes 74 near the blade tip 62 along the pressure sidewall 58 and/or through the cooling holes 78 located on a butt shelf 76 formed on the pressure sidewall 58, as shown in FIG. 3. As will be discussed in further detail below, the blade tip 62 may include additional cooling passages, particularly in a trailing edge trench 94, to further aid in cooling the blade tip 62. For instance, the cooling air discharged through cooling passages within the trench 94 in combination with cooling air discharged through the cooling holes 74 and/or 76 on the pressure sidewall 58 may fill and/or insulate the trench 94, thus forming a protective air barrier that protects the blade tip 62 from the hot combustion gases 17. As will be discussed in further detail below with reference to FIGS. 5-8, the trench 94 may be a slot, a groove, an indention, or a recess having a base formed between two opposite walls, such that the upper surface of each of the walls is radially further from the longitudinal axis 38 than the base of the trench 94. This may block the hot combustion gases 17 from entering (e.g., ingestion) the trench 94. As will be appreciated, this improved cooling technique may reduce the rate of oxidation at the blade tip 62, thus prolonging the life of the turbine blade 40.

Figures 4, 5, 8:
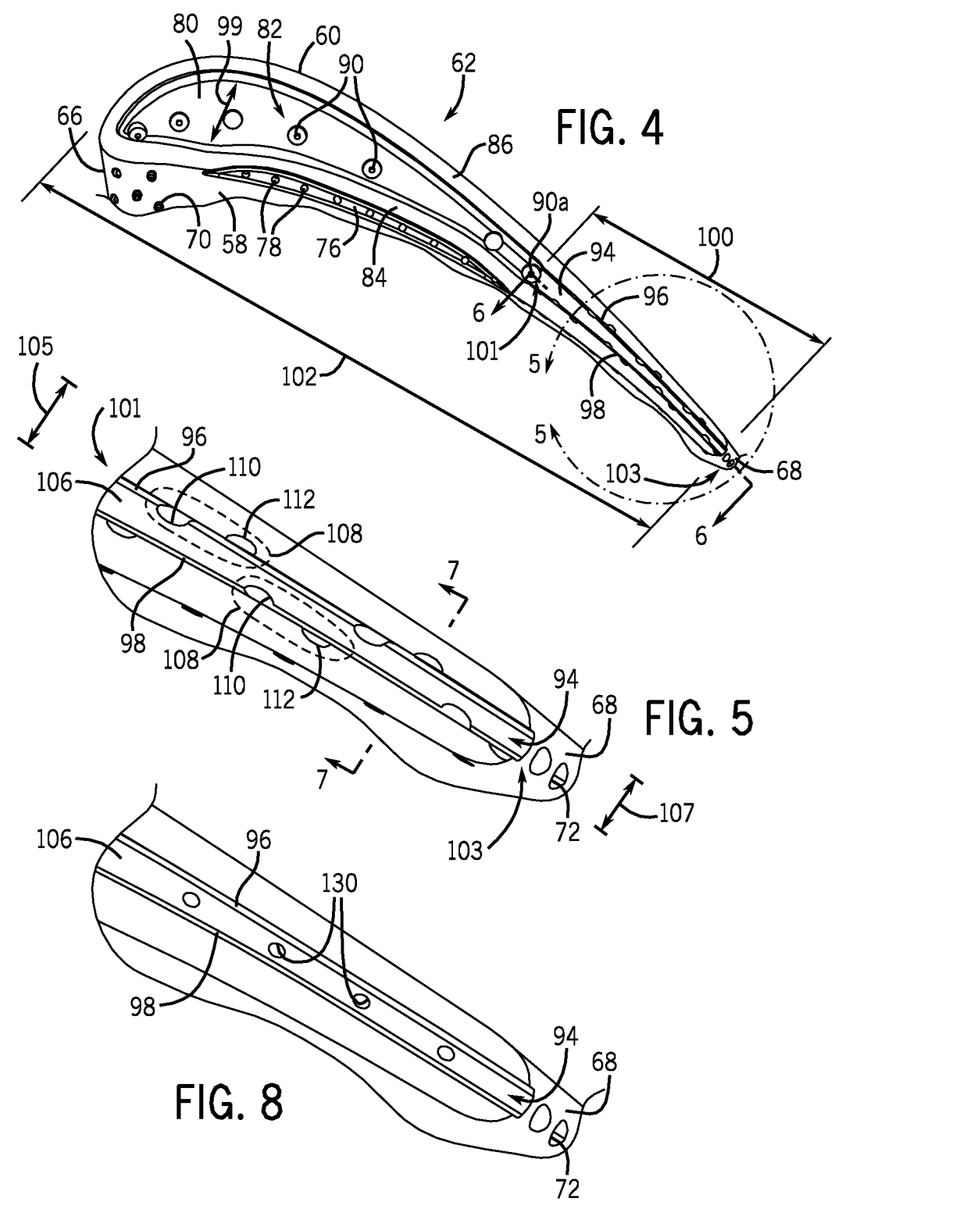
FIG. 4 is a top view of the turbine blade, as shown in FIG. 3, illustrating an embodiment of the tip of the turbine blade.
FIG. 5 is a partial top view of the turbine blade tip taken within arcuate line 5-5 of FIG. 4, illustrating an embodiment of the trailing edge trench.
FIG. 8 is a partial top view of the turbine blade tip taken within arcuate line 5-5 of FIG. 4, illustrating another embodiment of the trailing edge trench.

As mentioned above, in certain turbine blades, the trailing edge of the blade tips are often difficult to cool due to the aerodynamics of the turbine blades (e.g., most of the cooling air in the tip cavity 82 is swept over the suction side tip wall 86 before reaching the trailing edge 68). Accordingly, in the present embodiment, the turbine blade tip 62 also includes a trailing edge trench 94 which has angled cooling passages to improve cooling of the blade tip 62 near the trailing edge 68, as will be discussed in more detail below with respect to FIGS. 5-8. The trailing edge trench 94 may be a depression, groove, notch, trench, or other similar formation that is positioned between the aft end (e.g., the direction closer to the trailing edge 68 of the blade tip 62) of the tip cavity 82 and the trailing edge 68 of the blade tip 62, in a trailing edge region of the turbine blade 62 that is directly adjacent the trailing edge 68. For instance, the trailing edge region may be less than 20, 30, 40, or 50 percent of the total length 102 of the turbine blade. As depicted in FIG. 4, the trench 94 may be defined by a suction side trench wall 96 and a pressure side trench wall 98. The trailing edge trench 94 may extend in a generally linear path (e.g., chordally) from the aft end of the tip cavity 82 toward the trailing edge 68 of the blade tip 62. In some embodiments, the trailing edge trench 94 may be slightly arcuate (e.g., curved) depending on the curvature of the turbine blade 40. In certain embodiments, the length of the trailing edge trench 94, referred to herein as reference number 100, may be at least approximately 5, 10, 20, 25, 30, 40, or 50 percent of the chord length 102 of the turbine blade 40 measured from the trailing edge 68. While the present embodiment shows the trailing edge trench 94 leading directly to the trailing edge, it should be understood that in other embodiments, trailing edge trench 94 may terminate prior to the trailing edge 68.

The pressure side tip wall 84, suction side tip wall 86, and the tip plate or tip cap 80 may define a tip cavity or recess, shown here by reference number 82. That is, the tip cavity 82 may be an indented portion (or recess) of the blade tip 62 that is generally circumscribed by the pressure side tip wall 84 and suction side tip wall 86. The tip cavity 82 may further include one or more cooling passages 90 through which cooling air may be discharged from the hollow airfoil cavity 55. Thus, in operation, the cooling air discharged via the passages 90 fills the volume of the tip cavity 90, thereby protecting the blade tip 62 by at least partially insulating the blade tip 62 and blocking the hot combustion gases 17 from entering the tip cavity 82. Concurrently, cooling air discharged via the film holes 70 near the leading edge 66, the holes 78 on the butt shelf 76, and the film holes 74 (FIG. 3) also help to insulate the blade tip 62 from the hot combustion gases 17.

As mentioned above, in certain turbine blades, the trailing edge of the blade tips are often difficult to cool due to the aerodynamics of the turbine blades (e.g., most of the cooling air in the tip cavity 82 is swept over the suction side tip wall 86 before reaching the trailing edge 68). Accordingly, in the present embodiment, the turbine blade tip 62 also includes a trailing edge trench 94 which has angled cooling passages to improve cooling of the blade tip 62 near the trailing edge 68, as will be discussed in more detail below with respect to FIGS. 5-8. The trailing edge trench 94 may be a depression, groove, notch, trench, or other similar formation that is positioned between the aft end (e.g., the direction closer to the trailing edge 68 of the blade tip 62) of the tip cavity 82 and the trailing edge 68 of the blade tip 62, in a trailing edge region of the turbine blade 62 that is directly adjacent the trailing edge 68. For instance, the railing edge region may be less than 20, 30, 40, or 50 percent of the total length 102 of the turbine blade. As depicted in FIG. 4, the trench 94 may be defined by a suction side trench wall 96 and a pressure side trench wall 98. The trailing edge trench 94 may extend in a generally linear path (e.g., chordally) from the aft end of the tip cavity 82 toward the trailing edge 68 of the blade tip 62. In some embodiments, the trailing edge trench 94 may be slightly arcuate (e.g., curved) depending on the curvature of the turbine blade 40. In certain embodiments, the length of the trailing edge trench 94, referred to herein as reference number 100, may be at least approximately 5, 10, 20, 25, 30, 40, or 50 percent of the chord length 102 of the turbine blade 40 measured from the trailing edge 68. While the present embodiment shows the trailing edge trench 94 leading directly to the trailing edge, it should be understood that in other embodiments, trailing edge trench 94 may terminate prior to the trailing edge 68.

In the presently illustrated embodiment, the tip cavity 82 may include a cooling hole 90a located at the aft end, just prior to the leading side of the trench 94 (e.g., the side of the trench furthest from the trailing edge 68 and closer to the leading edge 66). Cooling air discharged through the cooling hole 90a may be directed along the trailing edge trench 94 and towards the trailing edge 68. Additionally, as will be discussed in further detail below, the trailing edge trench 94 also includes cooling passages through which cooling air from the hollow cavity 55 may be discharged. The cooling passages allow cooling air to circulate within the trench 94, thereby protecting the portion of the blade tip 62 near the trailing edge 68 by thus blocking the hot combustion gases 17 from entering the trailing edge trench 94. The exit-side (e.g., the side through which the coolant exits) of the cooling passages may be angled towards the trailing edge 68, which aids in directing the cooling air downstream through the trailing edge trench 94 and towards the trailing edge 68. In certain embodiments, the trailing edge trench 94 may be treated with a thermal protective coating, such as a metallic bondcoat, oxidation inhibitor, and/or thermal barrier coating.

Figure 6:
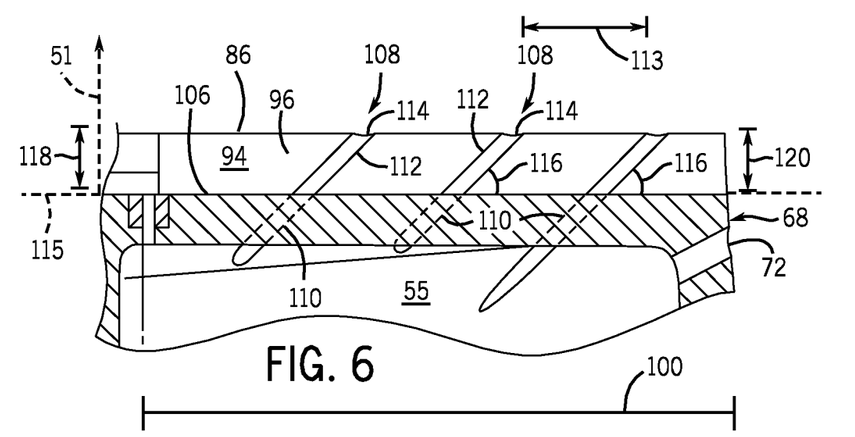
FIG. 6 is a cross-sectional side view taken along cut-line 6-6 of FIG. 4, illustrating an embodiment of the trailing edge trench of the turbine blade tip.

FIGS. 5 and 6 are detailed views of one embodiment of the trailing edge trench 94 of the turbine blade tip 62 taken about arcuate line 5-5 and cut-line 6-6, respectively, of FIG. 4. Particularly, FIG. 5 depicts the trailing edge trench 94 as having a trench floor 106 between the suction side trench wall 96 and the pressure side trench wall 98. The leading edge side 101 of the trench 94 may have a width 105, and the trailing edge side 103 of the trench 94 may have a width 107. The widths 105 and 107 may be equal (e.g., the trailing edge trench 94 has a generally constant width) or may be different from one another. For instance, in an embodiment where the width of the trailing edge trench 94 decreases towards the trailing edge 68, the width 105 may be greater than the width 107. Alternatively, in another embodiment, the width of the trailing edge trench 94 may increase towards the trailing edge, thus resulting in the width 107 being greater than the width 105. By way of example only, the width of the trench 94 (e.g., 105 and 107), in some embodiments, may be at least approximately 0.1, 25, 0.5, 0.75, 1, 1.5, 2, 2.5, 3, 3.5, or more centimeters. To provide another example, the width 105 may be approximately 5, 10, 15, 20, 25, 30, or 35 percent greater than the width 107, or vice versa. Further, when compared to the widest section (width 99) of the tip cavity 82, the widths 105 and 107 may be between 1 to 30 percent, 1 to 20 percent, or 1 to 10 percent of the width 99.

As discussed above, the trailing edge trench 94 also includes angled cooling passages, shown here by reference number 108. In the illustrated embodiment, each cooling passage 108 may include an angled cooling hole 110 (e.g., 110a, 110b in FIG. 7) that extends through the floor 106 of the trailing edge trench 94. As shown more clearly in FIG. 6, the opening of the cooling hole 110 on the trench floor 106 may continue into a slot or groove 112 (e.g., 112a, 112b in FIG. 7) having approximately the same angle (e.g., angle 116) that is formed along the suction side trench wall 96. The angle 116 of each cooling hole 110 and corresponding slot/groove 112 may be the same or may vary. For instance, the angle 116 may be fanned upward or downwards with respect to the line 115. As will be appreciated, the indention provided by the slot 112, increases the surface area along the trench walls 96 and 98 to enhance cooling, and also assists with circulating cooling air within the trench 94. The cooling passages 108 may be formed using any suitable technique, such as drilling, machining, laser cutting, and so forth. While the cross-sectional view provided by FIG. 6 depicts only the suction side trench wall 96, it should be appreciated that cooling passages 108 on the pressure side trench wall 98 may have a similar configuration.

Referring back to FIG. 5, the depicted embodiment has the cooling passages 108 formed on the suction side trench wall 96 and the pressure side trench wall 98 in a staggered arrangement. For instance, the cooling passages 108 may have different positions along the trench that alternate from one wall (e.g., 96) to the other wall (e.g., 98). In other embodiments, the cooling passages 108 may be aligned in a non-staggered arrangement, such that each cooling passage 108 on the wall 96 has a corresponding cooling passage 98 on the wall 98 located at approximately the same position along the length 100 of the trailing edge trench 94. In further embodiments, the trailing edge trench 94 may include cooling passages 108 on only the pressure side trench wall 98 or on only the suction side trench wall 96.

Referring again to FIG. 6, the cooling passages 108 may be spaced apart along each sidewall (e.g., 96 and 98) of the trailing edge trench 94 by a distance 113. In certain embodiments, the distance 113 may be at least approximately 0.25, 0.5, 0.75, 1, 1.5, 2, 2.5, 3, 3.5, 4, 4.5, or 5 centimeters. Additionally, the spacing 113 may also be defined, in some embodiments, as a percentage of the length of the trailing edge trench 94 (e.g., length 100) or as the length of the turbine blade (e.g., length 102). By way of example, the spacing 113 may be approximately 1 to 20 percent, 1 to 15 percent, 1 to 10 percent, or 1 to 5% of the trench length 100. The spacing distance 113 may also be expressed as a function of the hole diameters. For instance, in certain embodiments, the ratio of the distance 113 to the hole diameters may be between approximately 1.5 to 15. Further, the spacing 113 may vary between cooling passages 108. For instance, in some embodiments, the spacing 113 between cooling passages 108 may gradually decrease towards to the trailing edge 68 (e.g., the cooling passages 108 are positioned closer together near the trailing edge 68). For example, the spacing 113 between each of the cooling passages 108 could decrease by approximately 1 to 50 percent, 1 to 25 percent, 1 to 10 percent, or 1 to 5 percent from one cooling passage 108 to another.

As shown, the cooling passages 108 are formed at an angle 116, such that the exit side 114 of the slot 112 is angled towards the trailing edge 68 and away from the radial axis 51. The angle 116 may be defined with respect to line 115 that is parallel to the longitudinal axis 38 (FIG. 2) of the turbine system 10. In other embodiments, the line 115 may be parallel to an outermost radial edge of the turbine blade 40. In certain embodiments, cooling passages 108 may be angled towards the trailing edge 68, such that the angle 116 is between approximately 10 to 60 degrees with respect to the line 115 or, more specifically, between approximately 10 to 45 degrees with respect to the line 115. However, the angle 116 may range between 5 to 35 degrees, or may be less than approximately 10, 15, 20, 25, 30, 35, 40, 45, 50, 55, or 60 degrees.

Further, while the holes 110 are depicted in the present embodiment as being generally circular, it should be appreciated that the holes 110 may be formed as other shapes, such as square-shaped or rectangular-shaped holes, triangular shaped holes, oval-shaped holes, diamond-shaped holes, and so forth. The sizes of the holes 110, in certain embodiments, may be between approximately 0.05 to 0.3 centimeters in diameter. In other embodiments, the diameter of the holes may be less than 0.05 centimeters or greater than 0.3 centimeters. Further, the holes 110 may also vary in size along the trench. By way of example, the holes 110 may increase or decrease in size from the leading edge side 101 to the trailing edge side 103 of the trench 94. Also, each hole 110 may have a constant diameter or a variable diameter (e.g., converging and/or diverging) in the air flow direction. In one embodiment, the slots 112 may have a width that is approximately the same as their respective corresponding holes 110. Additionally, in some embodiments, the width of the slot 112 may increase or decrease from the trench floor 106 towards the exit side 114. Further, in one embodiment, the slot 112 may have an aspect ratio (e.g., depth-to-width ratio) of between approximately 0.5 to 4.0.

As further shown in FIG. 6, the trailing edge trench 94 may have a depth 118 at the leading edge side 101 and a depth 120 at the trailing edge side 103 (e.g., wherein depth is measured between the top of the trench walls 96 and 98 and the trench floor 106). In certain embodiments, the depth of the trailing edge trench 94 may be generally constant along the length 100 of the trench 94, such that the depth 118 and the depth 120 are equal. In other embodiments, the depth of the trailing edge trench 94 may become increasingly shallow towards the trailing edge 68, such that depth 118 is greater than the depth 120. By way of example, in such an embodiment, the depth 120 may be approximately 0 to 80 percent of the depth 118. In another embodiment, the depth of the trailing edge trench 94 may increase towards the trailing edge, such that depth 118 is less than the depth 120. By way of example, in such an embodiment, the depth 118 may be approximately 0 to 80 percent of the depth 120. Thus, the trailing edge trench 94 may have a sloping depth in the downstream direction, wherein the trench floor 106 is angled relative to the line 115 by an angle of approximately 1 to 20, 1 to 10, or 1 to 5 degrees.

Figure 7:
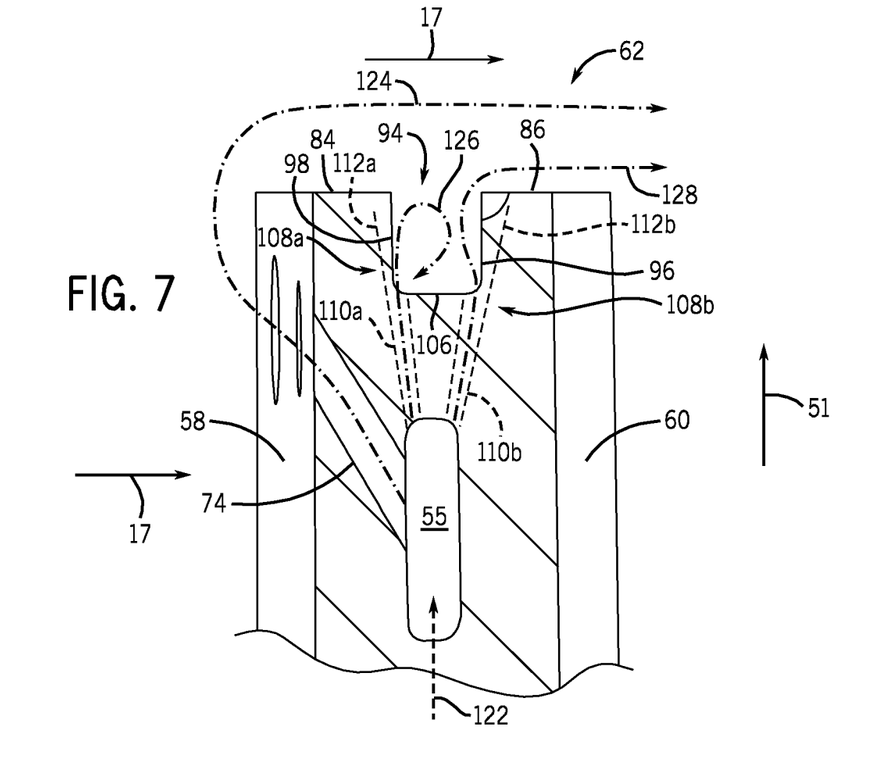
FIG. 7 is a cross-sectional end view taken along cut-line 7-7 of FIG. 5, illustrating an embodiment of the trailing edge trench of the turbine blade tip.

FIG. 7 depicts a cross-sectional end view of the trailing edge trench 94 taken along cut-line 7-7 of FIG. 5. FIG. 7 also illustrates the flow paths of cooling air through the film holes 74 on the pressure side 58 of the turbine blade 40, through the cooling passages 108a on the pressure side (e.g., wall 98) of the trailing edge trench 94, and through the cooling passages 108b on the suction side (e.g., wall 96) of the trailing edge trench 94. As shown, cooling air 122, which may be bled from the compressor 22 and/or provided from another coolant source (e.g., a fan or external blower), is directed into the hollow cavity 55 of the airfoil 54. A first portion of the cooling air 122 may be channeled through the film holes 74 and the cooling passages 108a and 108b. For instance, as indicated by the flow path 124, the cooling air 122 may flow through film holes 74, out the pressure side 58 of the airfoil 54, and over the blade tip 62 (e.g., over the tip walls 84 and 86). The second portion of the cooling air 122 may also flow through the cooling passages 108a on the pressure side of the trench 94 (e.g., along wall 98) and circulate within the cavity of the trench 94, as indicated by flow path 126. Further, a third portion of the cooling air 122 flows through the cooling passages 108b on the suction side of the trench 94 (e.g., along wall 96) and over the suction side tip wall 86.

In this manner, the trailing edge trench 94 is configured such that cooling air 122 circulates (e.g., flow path 126) within the trench 94 during operation, thus blocking the hot combustion gases 17 from entering the trench 94. Additionally, the cooling air 122 also flows over the blade tip 62, as indicated by flow paths 124 and 128, to further insulate the blade tip 62 from being exposed to the hot combustion gases 17. Accordingly, when compared to certain turbine blades, cooling is improved with respect to the region of the turbine blade tips 62 closer to the trailing edge 68. This reduces wear, rate of oxidation, and cracking, and thereby improves and increases the operational life of the turbine blade 40. Additionally, as shown in FIG. 7, while the pressure side and suction side trench walls 98 and 96, respectively, are shown as being parallel, it should be understood that in other embodiments, the trench walls 96 and 98 may also diverge or converge in the radial direction 51.

FIG. 8 shows a more detailed view of another embodiment of the trailing edge trench 94 of the turbine blade tip 62 taken about arcuate line 5-5 of FIG. 4. In this embodiment, the angled cooling passages 130 are formed on the trench floor 106 along the center of the trench 94, as opposed to be formed along the sidewalls 96 and 98 of the trench, as depicted in FIGS. 5-7. That is, the cooling passages 130 may include only a hole, without the corresponding grooves or slots 112 along the sidewalls 96 and 98, as shown in FIGS. 5-7. As can be appreciated, the holes 130 may be angled towards the trailing edge 68 of the trench 94, similar to the angling of the holes 110 (FIG. 6). This allows coolant exiting the holes 130 to be directed along the trench 94 and towards the trailing edge 68. Further, in another embodiment, the trailing edge trench 94 may have angled cooling passages 108 and 130 on the sidewalls (e.g., 96 and 98) and the trench floor 106, respectively.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a turbine blade having a radial blade tip; and
a trailing edge trench in the radial blade tip and extending in a direction towards a trailing edge of the turbine blade, wherein the trailing edge trench comprises a first set of cooling passages, each cooling passage of the first set of cooling passages comprises a first slot extending along a first sidewall of the trailing edge trench at a first angle away from a floor of the trailing edge trench in the direction towards the trailing edge, and each respective first slot is coupled to a first respective hole extending through the floor of the trailing edge trench.

2. The system of claim 1, wherein the trailing edge trench comprises a second set of cooling passages, each comprising a second slot formed along a second sidewall of the trailing edge trench and coupled to a second respective hole extending through the floor of the trailing edge trench, wherein the second sidewall is opposite the first sidewall.

3. The system of claim 2, wherein the first set of cooling passages and the second set of cooling passages are arranged in a staggered manner along the first and second sidewalls, respectively, of the trailing edge trench.

4. The system of claim 2, wherein the turbine blade comprises an airfoil having a pressure sidewall and a suction sidewall, wherein the pressure sidewall and the suction sidewall are spaced apart to define a hollow interior cavity configured to receive a flow of coolant, and the hollow interior cavity is coupled to the first set of cooling passages and the second set of cooling passages in the trailing edge trench.

5. The system of claim 2, wherein each of the first set of cooling passages are spaced apart from each other by a distance of between approximately 1 to 20 percent of a length of the trailing edge trench; and
wherein each of the second set of cooling passages are spaced apart from each other by a distance of between approximately 1 to 20 percent of the length of the trailing edge trench.

6. The system of claim 5, wherein a spacing between each of the first set of cooling passages and a spacing between each of the second set of cooling passages progressively decrease towards the trailing edge of the turbine blade.

7. The system of claim 2, wherein a distance between each of the first set of cooling passages on the first sidewall of the trailing edge trench is between approximately 0.25 to 5 centimeters, and wherein a distance between each of the second set of cooling passages on the second sidewall of the trailing edge trench is between approximately 0.25 to 5 centimeters.

8. The system of claim 1, wherein the first set of cooling passages on the first sidewall are close to the pressure side of the turbine blade.

9. The system of claim 1, wherein a length of the trailing edge trench is between approximately 5 to 40 percent of a chord length of the radial blade tip of the turbine blade.

10. A system, comprising:
a turbine comprising a turbine blade having a leading edge and a trailing edge, wherein the turbine blade comprises a radial blade tip; and
a trailing edge trench extending along the radial blade tip towards the trailing edge, wherein the trailing edge trench comprises:
a pressure side trench wall;
a suction side trench wall;
a trench floor; and
a plurality of cooling passages angled in a downstream direction towards the trailing edge of the turbine blade, wherein at least one of the plurality of cooling passages extends at least partially along the pressure side trench wall or the suction side trench wall.

11. The system of claim 10, wherein the radial blade tip comprises a tip plate, a suction side tip wall, and a pressure side tip wall defining a tip recess, wherein the trailing edge trench is formed in a trailing edge portion of the turbine blade between an aft end of the tip recess and the trailing edge of the turbine blade, and wherein a length of the trailing edge portion is between approximately 5 to 40 percent of a length of the turbine blade.

12. The system of claim 11, wherein the tip recess comprises one or more cooling holes configured to discharge a coolant into the tip recess.

13. The system of claim 10, wherein the plurality of cooling passages are angled at approximately 10 to 60 degrees with respect an outermost edge of the turbine blade.

14. The system of claim 10, wherein the plurality of cooling passages comprises a plurality of central passages one after another along the trench floor and between the pressure side trench wall and the suction side trench wall.

15. The system of claim 10, wherein each of the plurality of cooling passages comprises a slot and a hole, the slot extends along the pressure side trench wall or the suction side trench wall, the slot is coupled to the hole, and the hole extends through the trench floor into a hollow cavity of the turbine blade.

16. The system of claim 10, wherein the pressure side trench wall and the suction side trench wall converge or diverge relative to one another in the radial direction.

17. A system, comprising:
    a turbine comprising a turbine blade having a leading edge and a trailing edge, wherein the turbine blade comprises a radial blade tip; and
    a trailing edge trench extending chordally along a trailing edge portion of the radial blade tip towards the trailing edge, wherein a length of the trailing edge portion is between approximately 5 to 40 percent of a length of the turbine blade; and
    a plurality of angled cooling passages arranged within the trailing edge portion and within the trailing edge trench, wherein at least one of the plurality of angled cooling passages extends at least partially along a side wall of the trailing edge trench in a direction toward the trailing edge.

18. The system of claim 17, wherein a width of the trailing edge trench progressively decreases towards the trailing edge of the turbine blade.

19. The system of claim 17, wherein a depth of the trailing edge trench progressively decreases towards the trailing edge of the turbine blade.

20. The system of claim 17, wherein a spacing between the angled cooling passages progressively decreases towards the trailing edge of the turbine blade.

* * * * *